US 9,780,551 B2

(12) United States Patent
Broquie et al.

(10) Patent No.: US 9,780,551 B2
(45) Date of Patent: Oct. 3, 2017

(54) DIFFERENTIAL PROTECTION DEVICE FOR A SWITCHGEAR APPARATUS, AND ELECTRIC SWITCHGEAR APPARATUS COMPRISING ONE SUCH DEVICE

(71) Applicant: SCHNEIDER ELECTRIC INDUSTRIES SAS, Rueil-Malmaison (FR)

(72) Inventors: Vincent Broquie, Echirolles (FR); Simon Tian, Eybens (FR); Jerome Meunier-Carus, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 247 days.

(21) Appl. No.: 14/315,771

(22) Filed: Jun. 26, 2014

(65) Prior Publication Data
US 2015/0009601 A1    Jan. 8, 2015

(30) Foreign Application Priority Data
Jul. 5, 2013   (FR) ...................................... 13 56628

(51) Int. Cl.
*H02H 3/08* (2006.01)
*H02H 7/00* (2006.01)
*H02H 3/33* (2006.01)

(52) U.S. Cl.
CPC .............. *H02H 3/08* (2013.01); *H02H 7/008* (2013.01); *H02H 3/33* (2013.01)

(58) Field of Classification Search
CPC ...................................................... H02H 3/08
See application file for complete search history.

(56) References Cited

U.S. PATENT DOCUMENTS 4,953,054 A    8/1990   Fetzer et al.
5,691,869 A *  11/1997  Engel .................. H02H 1/0015
                                                           361/42
(Continued)

FOREIGN PATENT DOCUMENTS

EP    0 039 280 A1    11/1981
EP    1 441 429 A1    7/2004

OTHER PUBLICATIONS

French Preliminary Search Report issued Mar. 12, 2014, in French Application No. 13 56628 filed Jul. 5, 2013 (with English Translation of Categories of Cited Documents).

*Primary Examiner* — Thienvu Tran
*Assistant Examiner* — Tien Mai
(74) *Attorney, Agent, or Firm* — Oblon, McClelland, Maier & Neustadt, L.L.P.

(57) ABSTRACT

A differential protection device is designed for an electric disconnecting apparatus, the disconnecting apparatus comprising at least one fixed contact suitable for being connected to a corresponding electrical conductor, at least one movable contact, between a closed position, the movable contact being electrically connected to the corresponding fixed contact in the closed position and electrically isolated from the corresponding fixed contact in an open position, and an actuator for activating opening of the movable contacts when a differential fault is detected. The differential protection device comprises a controller for controlling the actuator. The differential protection device further comprises measuring circuitry for measuring an electrical variable associated with the controller and inhibiting circuitry for inhibiting the controller when the measured electrical variable satisfies a predetermined criterion.

19 Claims, 7 Drawing Sheets

(56) References Cited

U.S. PATENT DOCUMENTS

| | | | | |
|---|---|---|---|---|
| 2001/0040458 A1* | 11/2001 | MacBeth | ............ | H02H 1/0015 |
| | | | | 324/536 |
| 2002/0024782 A1* | 2/2002 | Kim | ................ | H02H 1/0015 |
| | | | | 361/42 |
| 2004/0145841 A1* | 7/2004 | Lambardin | ............ | H02H 3/332 |
| | | | | 361/42 |

* cited by examiner

DIFFERENTIAL PROTECTION DEVICE FOR A SWITCHGEAR APPARATUS, AND ELECTRIC SWITCHGEAR APPARATUS COMPRISING ONE SUCH DEVICE

BACKGROUND OF THE INVENTION

The present invention relates to a differential protection device for a disconnecting apparatus.

The disconnecting apparatus comprises at least two electrical conductors, at least one fixed contact suitable for being connected to a corresponding electrical conductor, and at least one movable contact, the or each movable contact being movable between a closed position wherein it is electrically connected to the corresponding fixed contact, and an open position, wherein it is electrically isolated from the corresponding fixed contact. The disconnecting apparatus also comprises a measuring toroid for measuring the differential current surrounding the electrical conductors, and an actuator for activating the opening of the movable contact or contacts when a differential fault is detected via the measuring toroid. The differential protection device comprises a control member for controlling the actuator.

The invention also relates to the electric disconnecting apparatus having such a differential protection device connected to the measuring toroid and to the actuator.

From the document FR 2 850 495 A1 a differential protection device and a disconnecting apparatus of the aforementioned type are already known. The differential protection device comprises an integrated circuit connected to the measuring toroid for measurement of the differential current. The integrated circuit includes the means for comparing a signal representative of the differential current to a reference threshold and the processing means for controlling an actuator for activating the opening of the movable contacts when a differential fault is detected. The integrated circuit also comprises the signal rectification means that receive said signal representative of the differential current and the filtering means connected to the rectifier means for filtering a rectified signal provided by the rectifier means and for providing a filtered rectified signal to the comparison means.

The actuator included in the disconnecting apparatus is a relay, comprising an electromagnetic coil. The relay is connected via power supply terminals to the electrical conductors for its power supply, the power supply terminals being arranged between the measuring toroid and the movable contact or contacts.

The electric disconnecting apparatus is designed to be connected in a specific direction, that is, with the electrical source connected upstream of the movable contacts and the electrical load connected downstream from the measuring toroid for measuring the differential current. In other words, when the disconnecting apparatus is connected in accordance with the direction planned, the power supply terminals, and in particular the coil of the actuator, are arranged between the movable contacts and the electrical load.

However, when the electric disconnecting apparatus is connected in the reverse direction, that is to say with the electrical source connected upstream of the power supply terminals, and in particular of the coil of the actuator, with the electrical load being connected downstream from the movable contacts, the occurrence of an electrical fault is thus adapted for causing the destruction of the actuator.

SUMMARY OF THE INVENTION

The object of the invention is therefore to provide a differential protection device that makes it possible to prevent destruction of the actuator upon the occurrence of an electrical fault when the electric disconnecting apparatus is connected in reverse.

To this end, the subject-matter of the invention relates to a differential protection device of the aforementioned type, wherein the device further comprises measuring means for measuring an electrical variable associated with the control member and inhibiting means for inhibiting the control member when the measured electrical variable satisfies a predetermined criterion.

According to other advantageous aspects of the invention, the differential protection device includes one or more of the following characteristic features, taken individually or according to any technically possible combination:
- the electrical variable measured is a current adapted for flowing through the control member;
- the control member includes two conducting electrodes and one control electrode, and the measured electrical variable is a voltage of the control member, measured between two electrodes among the electrodes of the control member;
- the control member is a static switch, preferably an element selected from the group consisting of: an insulated gate field effect transistor, a bipolar transistor, an insulated gate bipolar transistor and a thyristor;
- the control member is a thyristor, and the junction between the gate terminal of the thyristor and the cathode of the thyristor forms a diode, and the measuring means are adapted for measuring a current via the voltage at the ends of said diode;
- the control member is a transistor, such as an insulated gate field effect transistor, a bipolar transistor or an insulated gate bipolar transistor, and the measuring means are adapted for measuring a current via the voltage between the control electrode and the drain electrode or emitter electrode of said transistor;
- the device comprises detecting and driving means for detecting a differential fault and for driving the control member, the detecting and driving means being adapted for being connected to the measuring toroid and of providing a control signal to the control member when a differential fault is detected, and the inhibiting means are adapted, when the measured electrical variable satisfies the predetermined criterion, for inhibiting the control member whatever may be the control signal supplied to the control member by the detecting and driving means;
- the inhibiting means comprise a switch connected in series between a control electrode of the control member and the detecting and driving means, the switch being open in order to inhibit the control member;
- the inhibiting means comprise a switch connected between a control electrode and a conduction electrode of the control member, the switch being closed in order to inhibit the control member;
- the inhibiting means comprise an open collector transistor, connected between a control electrode and a conduction electrode of the control member, the open collector transistor being turned on in order to inhibit the control member;
- the predetermined criterion is the exceeding of a threshold, and the threshold has a predetermined value such that the control member is inhibited by the inhibiting means after the actuator has activated the opening of the movable contacts in case of detection of a differential fault;

the measuring means comprise a filter member for filtering the electrical variable, the filter member preferably comprising a resistor and a capacitor; and the inhibiting means comprise a hysteresis comparator connected to the output of the measuring means.

The invention also relates to an electric disconnecting apparatus, such as a differential circuit breaker, comprising:

at least two electrical conductors, at least one fixed contact connected to a corresponding electrical conductor, at least one movable contact, the or each movable contact being movable between a closed position, wherein it is electrically connected to the corresponding fixed contact, and an open position, wherein it is electrically isolated from the corresponding fixed contact, a measuring toroid for measuring the differential current, the toroid surrounding the electrical conductors, an actuator for activating the opening of the movable contact or contacts when a differential fault is detected via the measuring toroid, and a differential protection device connected to the measuring toroid and to the actuator, wherein the differential protection device is as defined here above.

According to another advantageous aspect of the invention, the actuator includes an electromagnetic coil, one end of the electromagnetic coil being connected to the control member.

BRIEF DESCRIPTION OF THE DRAWINGS

These characteristic features and advantages of the invention shall be apparent upon reading the description which follows, provided purely by way of non-limiting example and with reference made to the accompanying drawings wherein.

DETAILED DESCRIPTION OF PREFERRED EMBODIMENTS

Figure 1:
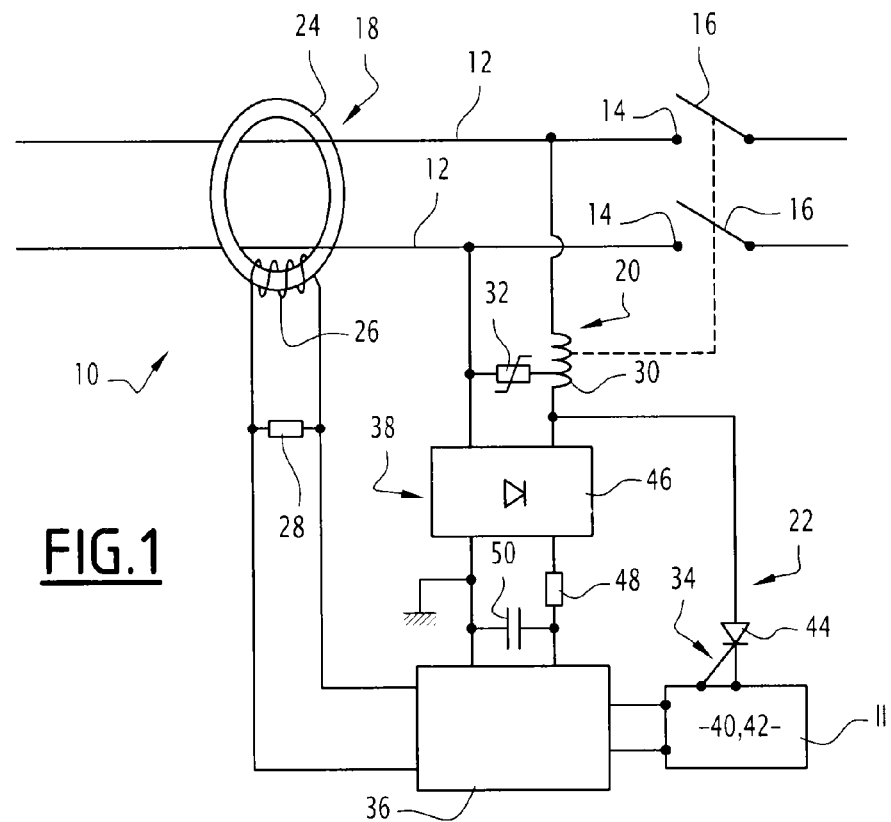
FIG. 1 is a schematic representation of an electric disconnecting apparatus according to the invention, the electric disconnecting apparatus comprising two fixed contacts, two movable contacts, one measuring toroid for measuring the differential current surrounding two electrical conductors connected to two fixed contacts, an actuator for activating the opening of the movable contacts and a differential protection device connected to the measuring toroid and the actuator.

In FIG. 1, an electric disconnecting apparatus 10 comprises at least two electrical conductors 12, at least one fixed contact 14 connected to a corresponding electrical conductor 12, and at least one movable contact 16, the or each movable contact 16 is movable between a closed position, wherein the movable contact 16 is electrically connected to the corresponding fixed contact 14, and an open position wherein the movable contact 16 is electrically isolated from the corresponding fixed contact 14.

In the example in FIG. 1, the electric disconnecting apparatus 10 comprises two electrical conductors 12, that is, one phase conductor and one neutral conductor, two fixed contacts and two movable contacts 14, 16, all the electrical conductors 12, including the neutral conductor, being adapted for being switched off by the disconnecting apparatus 10 in this example. In other words, the disconnecting apparatus 10 shown in FIG. 1 corresponds to a single phase apparatus with switching of the neutral conductor.

Figure 10:
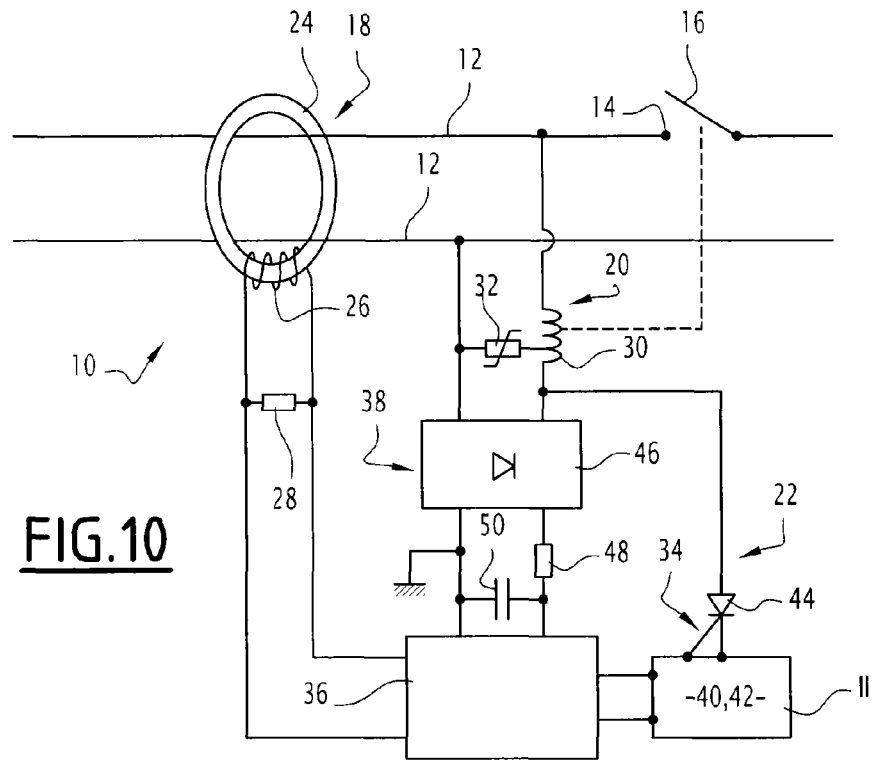
FIG. 10 is a view similar to that in FIG. 1 according to a third embodiment of the invention, the electric disconnecting apparatus comprising one single fixed contact and one single movable contact.

In the variant shown in FIG. 10, the electric disconnecting apparatus 10 comprises two electrical conductors 12, that is the phase conductor and the neutral conductor, one single fixed contact 14 and one single movable contact 16, the neutral conductor is not adapted for being switched off by the disconnecting apparatus 10 according to this variant. In other words, the disconnecting apparatus 10 according to this variant corresponds to a single phase apparatus without switching of the neutral.

Figure 11:
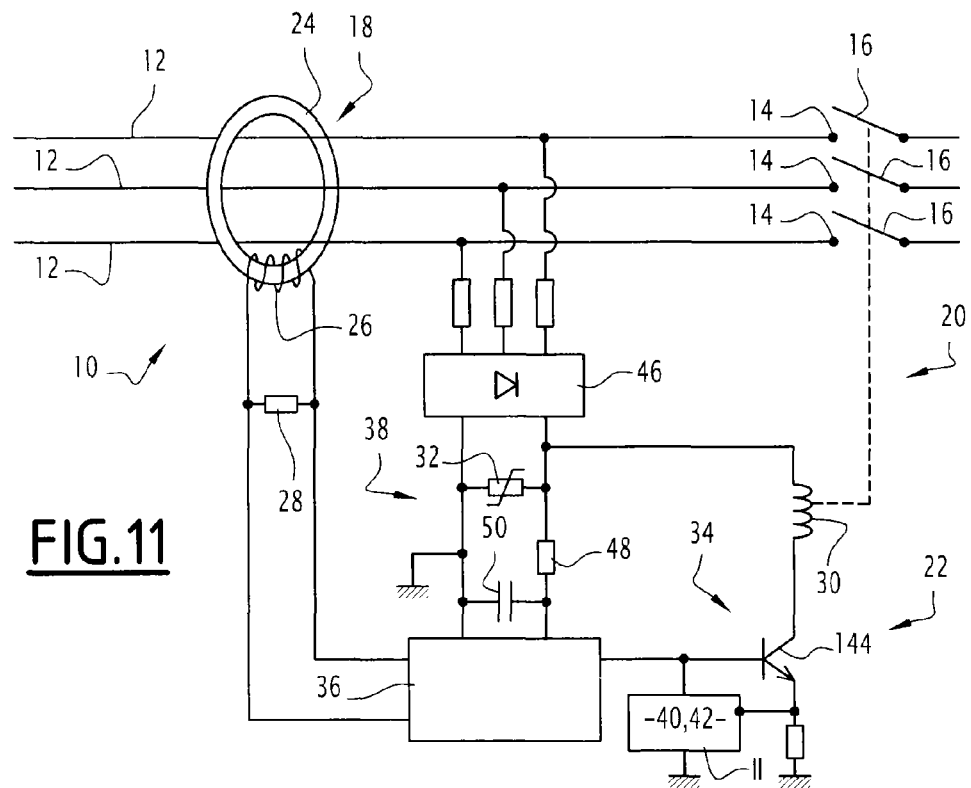
FIG. 11 is a view similar to that in FIG. 1 according to a fourth embodiment of the invention, the electric disconnecting apparatus comprising three fixed contacts and three movable contacts.

In the variant shown in FIG. 11, the electric disconnecting apparatus 10 is a three pole device with or without neutral switching, and comprises three electrical conductors 12, three fixed contacts 14 and three movable contacts 16. In the case of a three pole device without switching of the neutral, the three electrical conductors 12 are three phase conductors, the neutral conductor being separate and not being connected to the three pole device. In the case of a three pole device with switching of the neutral, the three electrical conductors 12 are two phase conductors and one neutral conductor.

Figure 12:
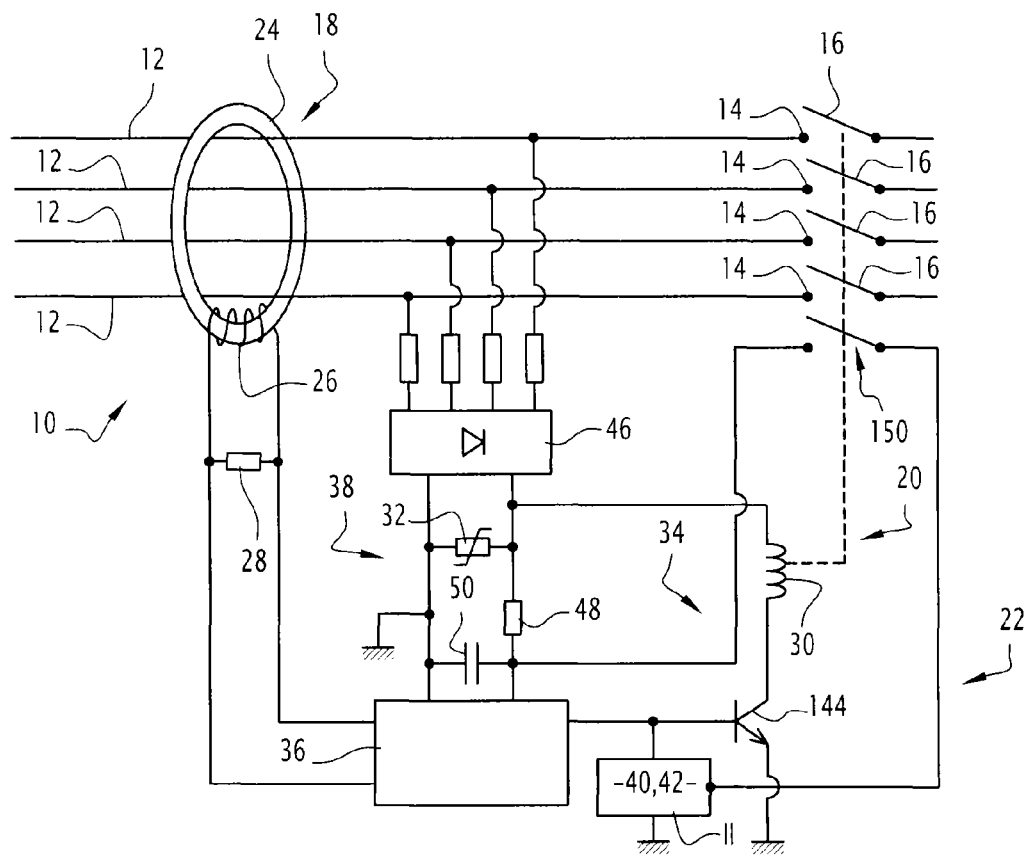
FIG. 12 is a view similar to that in FIG. 1 according to a fifth embodiment of the invention, the electric disconnecting apparatus comprising tour fixed contacts and four movable contacts, and the differential protection device further comprising an auxiliary switch serving as a digital (on/off) input to the inhibiting means shown in FIG. 6.
Figure 13:
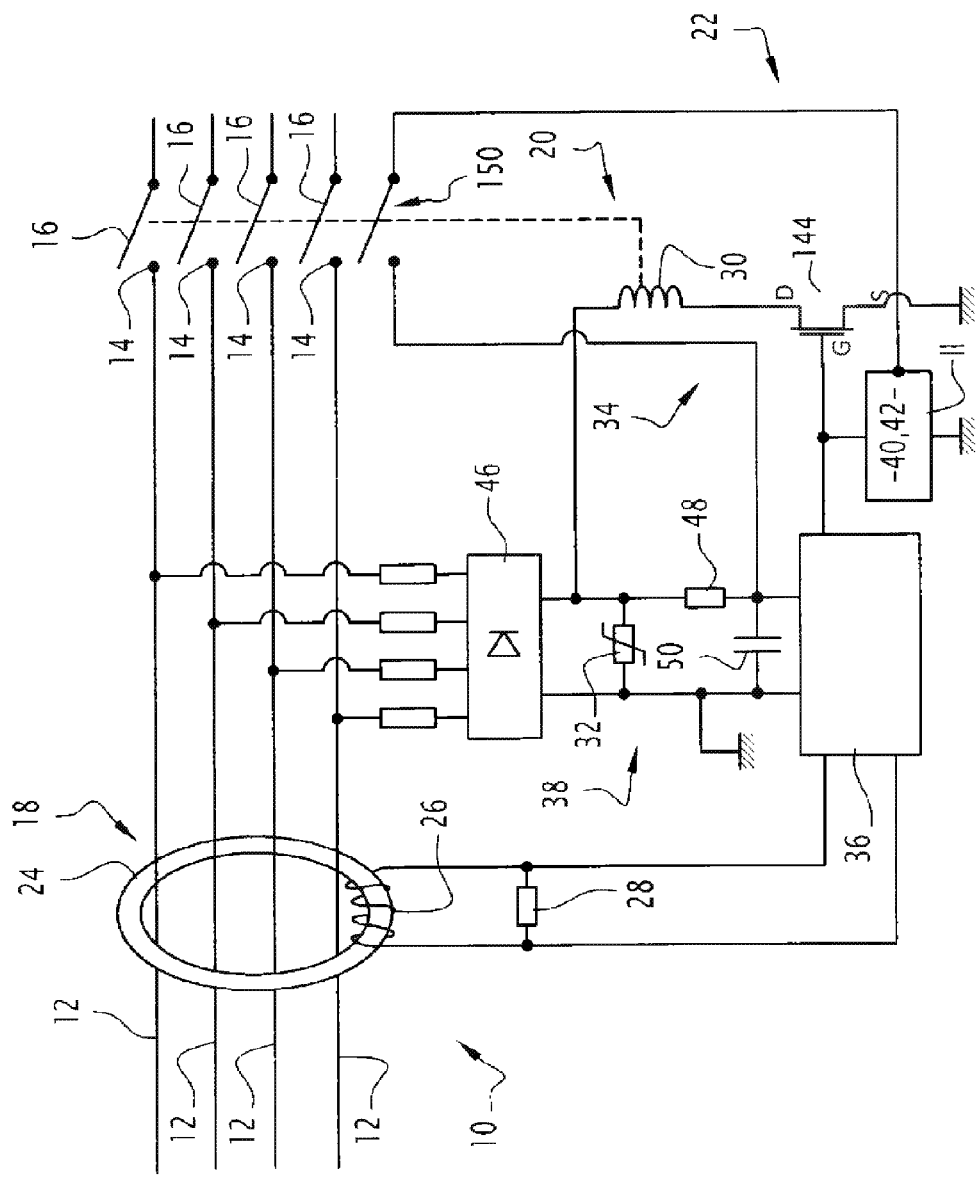
FIG. 13 is a view similar to that in FIG. 12 according to a variation of the fifth embodiment of the invention, the electric disconnecting apparatus comprising four fixed contacts and four movable contacts.

By way of a variant shown in FIG. 12, the electric disconnecting apparatus 10 is a four pole device with switching of the neutral, and comprises four electrical conductors 12, four fixed contacts and four movable contacts 14, 16.

By way of a variant not shown, the electric disconnecting apparatus is a four pole device 10 without switching of the neutral, and comprises four electrical conductors 12, three fixed contacts 14 and three movable contacts 16.

In other words, the electric disconnecting apparatus 10 is a single phase, three pole or even four pole device, with or without switching of the neutral, the absence of neutral switching being possible when the disconnecting apparatus 10 is a single phase or four pole device.

The electric disconnecting apparatus 10 comprises a toroid 18 for measuring the differential current, the toroid 18 surrounding the electrical conductors 12, and an actuator 20 for activating the opening of the movable contacts 16 when a differential fault is detected via the measuring toroid 18.

The electric disconnecting apparatus 10 also comprises a differential protection device 22 connected to the measuring toroid 18 and the actuator 20.

The electric disconnecting apparatus 10 is for example, a differential circuit breaker.

The measuring toroid 18 comprises, for example, a primary winding 24 surrounding the electrical conductors 12, a secondary winding 26 and a shunt resistor 28 connected to the secondary winding 26, the shunt resistor 28 provides the ability to convert the current flowing in the secondary winding 26 into a voltage measurable by an analogue-digital converter. The measuring toroid 18 is adapted to output an alternating current voltage to the differential protection device 22 via the secondary winding 26 and the load resistor 28.

By way of a variant, the measuring toroid 18 is a Rogowski toroid, and is also suitable for supplying an alternating current voltage to the differential protection device 22.

The actuator 20 is, for example, a relay. The relay 20 comprises an electromagnetic coil 30 adapted for triggering the displacement of the movable contacts 16 from their closed position to their open position. In other words, the actuator 20 is adapted for controlling the opening of the movable contacts 16.

In addition, the actuator 20 includes a varistor 32 for protection against overvoltage, the varistor 32 being disposed between the coil 30 and the differential protection device 22. The varistor 32 is thus adapted to protect the differential protection device 22 against overvoltage.

The differential protection device 22 includes a control member 34 for controlling the actuator and the means 36 for detecting a differential fault and for driving the control member. The differential protection device 22 also comprises a power supply circuit 38 for the detection and driving means.

Figure 2:
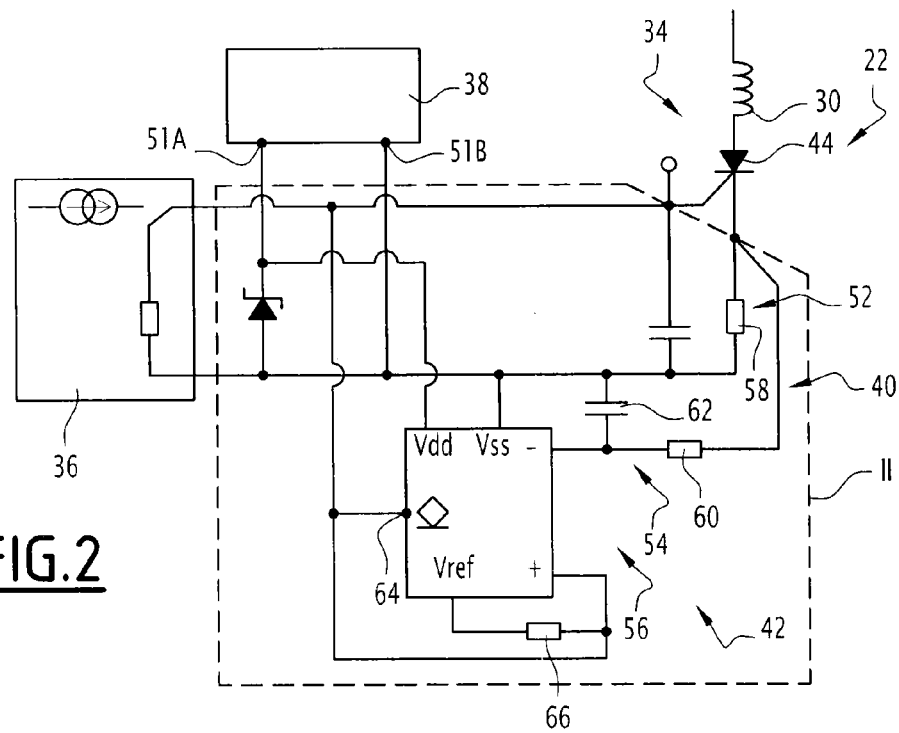
FIG. 2 is an electrical schematic drawing of the differential protection device according to a first embodiment of the invention.

According to the invention, the differential protection device 22 comprises the means 40 for measuring an electrical variable associated with the control member 34 and the means 42 for inhibiting the control member when the measured electrical variable satisfies a predetermined criterion, as shown in FIGS. 1 and 2, the framed area II of the FIG. 1 being represented in a detailed manner in FIG. 2.

The control member 34 is connected to one end of the electromagnetic coil 30, the other end of the electromagnetic coil 30 being connected to a corresponding electrical conductor 12.

In the embodiment described, the control member 34 comprises a thyristor 44. By way of a variant, the control member 34 comprises an insulated gate field effect transistor, also known as MOSFET (acronym for Metal Oxide Semiconductor Field Effect Transistor), a bipolar transistor, an insulated gate bipolar transistor, also known as IGBT (acronym for Insulated Gate Bipolar Transistor). The control member 34 is preferably composed of a static switch, such as an element selected from the group consisting of: an insulated gate field effect transistor, a bipolar transistor, an insulated gate bipolar transistor, and a thyristor.

The control member 34 is generally speaking, a static switch that is controllable between a conducting state and a non conducting state, and includes a control electrode for controlling in particular the opening of the switch, that is to say, the passage from its conducting (on) state to its non conducting (off) state. The control member 34 also includes two conducting electrodes for the flow of current when the switch is in its 'on' state.

When the control member 34 includes a thyristor, the control electrode is called a gate and the conduction electrodes are referred to as anode and cathode respectively. The control electrode is known as a gate or even gate electrode, when the control member 34 includes a MOSFET or an IGBT, and the control electrode is called a base, or even base electrode, when the control member 34 includes a bipolar transistor. The conducting electrodes are respectively known as collector and emitter, or even collector electrode and emitter electrode, when the control member 34 includes an IGBT or a bipolar transistor, and the conduction electrodes are respectively known as source and drain, or even source electrode and drain electrode, when the control member 34 includes a MOSFET.

The detection and control means 36 comprise the means, not shown, for comparing a signal representative of the differential current with a first threshold, the representative signal being emanated from the measuring toroid 18. The detection and control means 36 comprise the processing means, not shown, for driving the control member 34 when a differential fault is detected by the comparison means.

In addition, the detection and control means 36 include the rectifier means, not shown, that receive said signal representative of the differential current and the filtering means, not shown, connected to the rectifier means for filtering a rectified signal provided by the rectifier means and for providing a filtered rectified signal to the comparison means.

The detection and control means 36 are, for example, configured in the form of a dedicated integrated circuit.

The power supply circuit 38 comprises a rectifier 46, connected on the one hand to an electrical conductor 12, and on the other hand, to the end of the coil 30 to which the control member 34 is connected, the rectifier 46 being adapted for rectifying the alternating current voltage coming from the electrical conductors 12 in order to supply the detection and control means 36 with direct current voltage. The power supply circuit 38 includes in addition a resistor 48 and a capacitor 50, connected between the rectifier 46 and the detection and control means 36, in order to filter the voltage coming from the rectifier 46 while also decreasing the value of this rectified voltage.

The power supply circuit 38 has two output terminals 51A, 51B, namely, a positive terminal 51A and a negative terminal 51B, adapted for outputting the direct current voltage to the detection and driving means 36, as well as the inhibiting means 42.

According to the first embodiment, the electrical variable measured by the measuring means 40 is a current that is adapted for circulating in the control member 34. The measuring means 40 thus comprises an element 52 for measuring the current flowing in the control member, the measuring element being for example adapted for providing a voltage whose value is a function of the measured current.

Additionally, the measuring means 40 include a filter member 54 of the electrical variable measured. In the embodiment described, the filter member 54 is a first order filter for obtaining an average value of the voltage supplied by the measuring member 52.

The inhibiting means 42 are adapted for inhibiting the control member 34 when the measured electrical variable satisfies the predetermined criterion. The predetermined criterion is, for example, the exceeding of a second threshold, and the second threshold has a predetermined value such that the control member 34 is inhibited by the inhibiting means 42 after the actuator 20 has activated the opening of the movable contacts 16 in the event of detection of a differential fault.

The term inhibition of the control member 34 is understood to refer to the overriding command of the control member 34 to its non conducting state, whatever be the command order otherwise received eventually from the detecting and driving means 36. Inhibition of the control member 34 then allows the zero crossing of the current flowing in the actuator 20, for example the zero crossing of the current flowing in the electromagnetic coil 30.

The inhibiting means 42 comprise, for example, a hysteresis comparator 56 connected to the output of the measuring means 40, in order to compare the measured electrical variable derived from the measuring means 40 with the second threshold.

The anode of the thyristor 44 is connected to the electromagnetic coil 30. The gate terminal of the thyristor 44 is connected, on the one hand, to the detection and driving means 36, and on the other hand, to the inhibiting means 42. The cathode of the thyristor 44 is connected to the measuring means 40.

In the embodiment shown in FIG. 2, the measuring element 52 is adapted for measuring the current flowing in the thyristor 44, that is to say, the current flowing in the electromagnetic coil 30. The measuring element 52 comprises, for example, of a first resistor 58 connected to the cathode of the thyristor 44.

In the example of the embodiment in FIG. 2, the filtering member 54 includes a second resistor 60 and a capacitor 62. The filtering member 54 is also called RC filter. The capacitor 62 is connected between the first resistor 58 and the inverting input, marked by the sign '−', of the hysteresis comparator 56, and the second resistor 60 is connected between the cathode of the thyristor 44 and the inverting input of the hysteresis comparator 56.

The hysteresis comparator 56 includes the inverting input, described here above, connected to the output of the filtering member 54, a non-inverting input, marked by the sign "+", a terminal Vref having a reference voltage and an output terminal 64, for example, with open collector.

The hysteresis comparator 56 also comprises a first power supply terminal Vdd and a second power supply terminal Vss, respectively connected to the power supply circuit 38, as represented in FIG. 2.

The hysteresis comparator 56 includes a third resistor 66 connected between its terminal Vref and its inverting input.

The second predetermined threshold value is, for example, a voltage present at the non-inverting input of the hysteresis comparator 56, in order to be compared with a voltage which is a function of the average value of the voltage across the first resistor's 58 terminals and is present on the inverting input of the hysteresis comparator 56, said average value being derived from the filtering member 54. In the example of the embodiment shown in FIG. 2, the second threshold is biased by the reference voltage through the third resistor 66.

In the example of the embodiment described, the output terminal 64 of the comparator is connected directly to the control member 34, for example directly to the gate terminal of the thyristor 44.

The operation of the differential protection device 22 according to this first embodiment will now be explained.

In the absence of a differential fault current, the control member 34, in particular the thyristor 44, is not controlled, and the control voltage of the thyristor 44 is null. The voltage value at the inverting input of the hysteresis comparator 56 is thus then null, and therefore less than the voltage present at the non-inverting input of the comparator 56, the non-inverting input being biased at the value of the second threshold, by a strictly positive value. The output terminal 64 of the hysteresis comparator 56 is thus in a state of high impedance, and the control member 34 is then not inhibited.

In the presence of a differential fault current and when the electric disconnecting apparatus 10 is connected in reverse, that is to say, with the electrical source connected upstream of the measuring toroid 18 and the movable contacts 16, the detection and driving means 36 drive the control member 34, in particular the thyristor 44, by a current command, and the gate terminal voltage of the thyristor 44 is then substantially equal to 0.7 V. The filtering member 54 then averages the voltage across the first resistor's 58 terminals, and outputs a voltage on the inverting input of the hysteresis comparator 56 which is a function of the effective current flowing in the electromagnetic coil 30. When the current in the electromagnetic coil 30 increases, the current flowing in the thyristor 44 increases, and the voltage present at the inverting input of the comparator 56 also increases until it becomes greater than the value of the second threshold. The output terminal 64 of the hysteresis comparator 56 then goes into a state of low impedance, which inhibits the control member 34, in particular the thyristor 44. The thyristor 44 is then turned off at the instant of zero crossing of the current.

It should be noted that the control member 34, in particular the thyristor 44 is then inhibited by the inhibiting means 42 whatever be the command signal supplied to the control member 34 by the detection and driving means 36. In other words, when the electrical variable measured by the measuring means 40 satisfies the predetermined criterion, such as the exceeding of the second threshold, then the inhibiting means 42 are adapted for inhibiting the control member 34 whatever be the command signal supplied to the control member 34 by the detection and driving means 36.

More specifically, the voltage present at the inverting input of the hysteresis comparator 56 becomes higher than the voltage present on the non-inverting input of the hysteresis comparator 56 when the current in the electromagnetic coil 30 is sufficient for achieving the activating of the opening of the movable contacts 16 and when the half cycle is negative.

Figure 3:
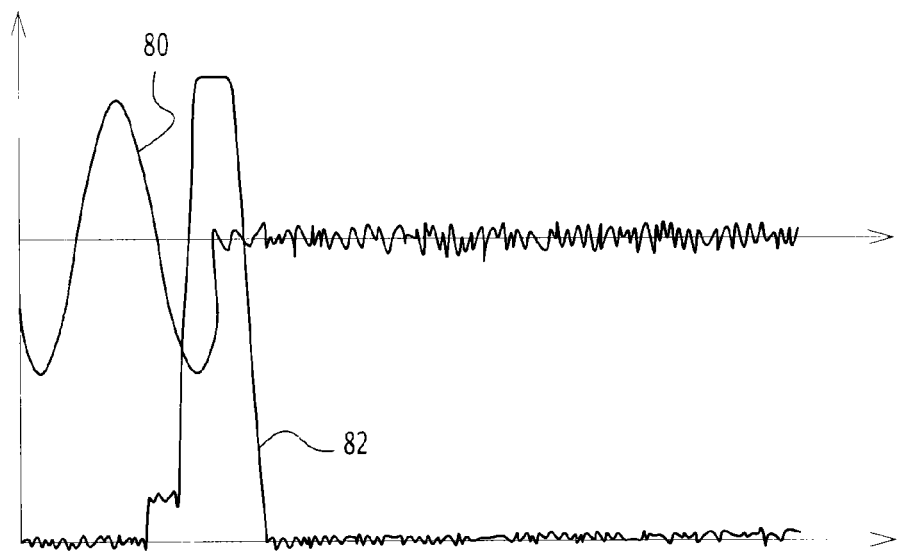
FIG. 3 is a set of curves representing on the one hand, the electric current flowing in the movable contacts, and on the other hand, the electric current flowing in a coil of the actuator shown in FIG. 1, FIGS. 4 and 5 are views similar to that in FIG. 2 according to the first and second variants of the first embodiment.

In FIG. 3, the curve 80 represents the current flowing through the movable contacts 16, and the curve 82 represents the current flowing in the electromagnetic coil 30. It is then observed that the current in the electromagnetic coil 30 is cancelled, by inhibition of the control member 34 by means of using the inhibiting means 42, from the first negative half cycle after the opening of the movable contacts 16, this opening of the movable contacts 16 being a consequence of the activating controlled by the detecting and driving means 36.

The differential protection device 22 according to the invention thus makes it possible to limit the heating of the electromagnetic coil 30, and thereby to avoid destruction of actuator 20 upon the occurrence of an electrical fault, in particular when the electric disconnecting apparatus 10 is connected in reverse.

The differential protection device 22 moreover is also inexpensive, since it does not require the addition of an auxiliary power switch connected directly between the electrical conductors 12. In example of the embodiment described, the differential protection device 22 does not include an auxiliary power switch arranged directly between the electrical conductors 12.

Figure 4:
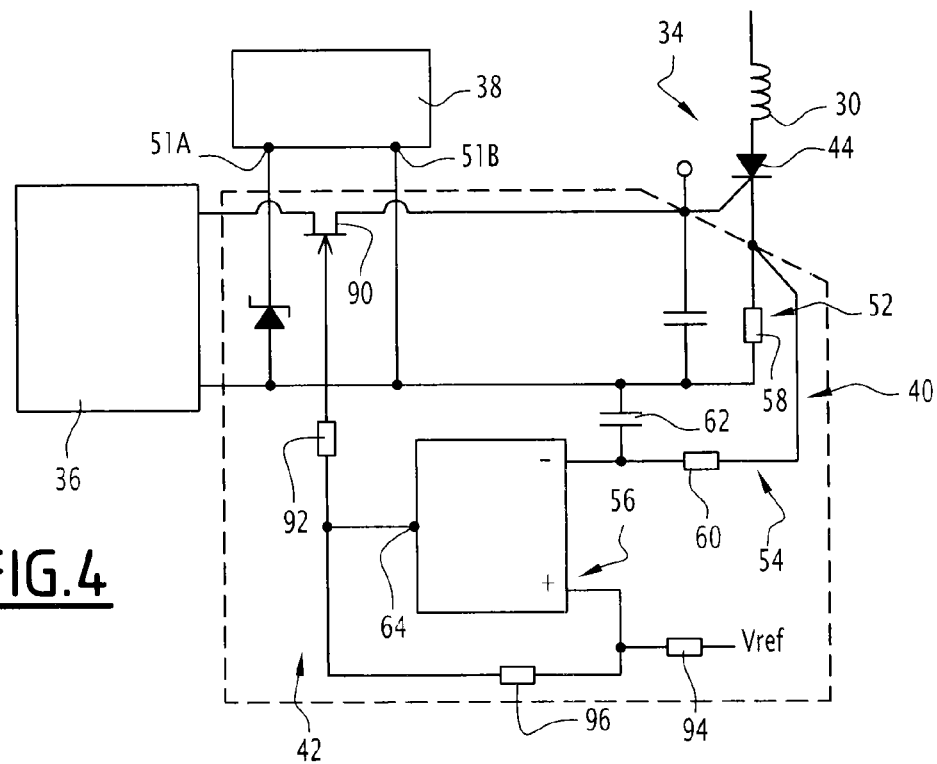

The FIG. 4 illustrates a first variant of the first embodiment for which the elements that are identical to those of the first embodiment, described previously with reference to FIGS. 1 to 3, are marked with the identical reference numerals and are thus not described again.

According to this first variant, the inhibiting means 42 comprise a switch 90 adapted for inhibiting the control member 34, the switch 90 being connected to the output terminal 64 of the hysteresis comparator 56 via a fourth resistor 92. The switch 90 is connected in series between the detection and driving means 36 and the gate terminal of the thyristor 44.

The second threshold present on the non-inverting input of the hysteresis comparator 56 is biased by a reference voltage Vref via a fifth resistor 94 connected between the non-inverting input and said reference voltage Vref and via a sixth resistor 96 connected between the output terminal 64 and the non-inverting input of the hysteresis comparator 56.

In a manner similar to that which has previously been described above, the second threshold is predetermined such that the control member 34 is inhibited by the inhibiting means 42 after the actuator 20 has triggered the opening of the movable contacts 16 in the event of detection of a differential fault.

The operation of this first variant of the first embodiment is similar to that which has been described here above. Indeed, in the presence of a differential fault current and when the electric disconnecting apparatus 10 is connected in reverse, the hysteresis comparator 56 detects the moment when the average value of the voltage across the first resistor's 58 terminals, this voltage being a function of the current flowing through the electromagnetic coil 30, exceeds the value of the second threshold, this average value being derived from the filtering member 54. The hysteresis comparator 56 then commands the opening of the switch 90 via its output terminal 64, which inhibits the control member 34, in particular the thyristor 44. In other words, the control member 34 is inhibited by means of the switch 90 via a circuit breaker in series at the input of the gate terminal when the control member is a thyristor 34, or indeed via a circuit breaker in series at the input of the gate or the base when the control member 34 is a transistor such as an insulated gate field effect transistor, a bipolar transistor or an insulated gate bipolar transistor.

The advantages of this first variant are identical to those previously described above for the first embodiment, and shall not be described again.

Figure 5:
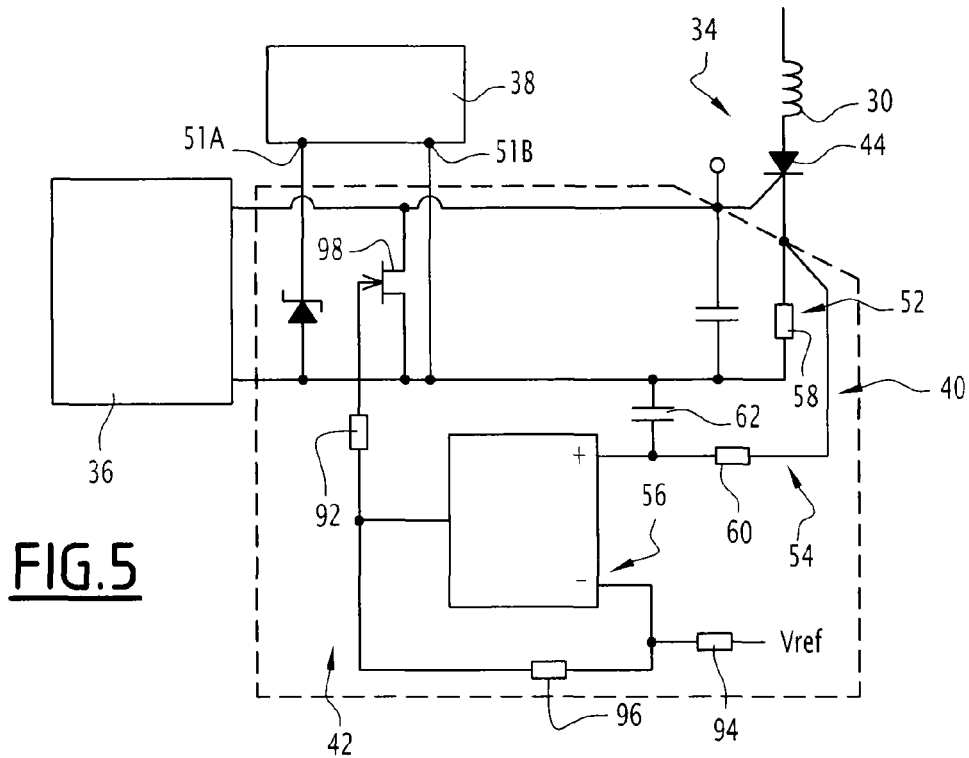

The FIG. 5 illustrates a second variant of the first embodiment wherein the elements that are identical to those of the first variant of the first embodiment previously described above with reference to FIG. 4, are identified by identical reference numerals and shall not be described again.

According to this second variant, the inhibiting means to 42 include a switch 98 that is adapted for inhibiting the control member 34, the switch 98 being connected between the gate terminal of the thyristor 44 and the negative output terminal 51B of the power supply circuit.

The second threshold present on the non-inverting input of the hysteresis comparator 56 is also biased by the reference voltage Vref via the fifth resistor 94 connected between the non-inverting input and said reference voltage Vref and the sixth resistance 96 connected between the output terminal 64 and the non-inverting input of the hysteresis comparator 56.

The operation of this second variant of the first embodiment is similar to that of the first variant previously described above, with the difference being that in the presence of a differential fault current and when the electric disconnecting apparatus 10 is connected in reverse, the hysteresis comparator 56 commands the closure of the switch 98 via its output terminal 64, which inhibits the control member 34, in particular the thyristor 44 by connecting the gate terminal of the thyristor 44 to the negative output terminal 51B of the power supply circuit. In other words, the control member 34 is inhibited by means of the switch 98 via a short circuit between the gate terminal and the cathode when the control member 34 is a thyristor, or via a short circuit between the gate and the drain, between the base and the emitter, or respectively, between the gate and the emitter when the control member 34 is a transistor such as an insulated gate field effect transistor, a bipolar transistor or respectively an insulated gate bipolar transistor.

The advantages of this second variant are identical to those previously described above for the first embodiment, and shall not be described again.

FIGS. 6 to 9 illustrate a second embodiment of the invention, wherein the elements that are identical to those of the first embodiment, previously described above, are identified by identical reference numerals and shall not be described again.

According to this second embodiment, the electrical variable measured by the measuring means 40 is a voltage of the control member 34, measured between two electrodes among the three electrodes of the control member 34.

The measured voltage is, for example, the control voltage of the control member 34, that is to say the gate terminal voltage, that is the voltage between the gate terminal and the cathode, when the control member 34 is a thyristor, or the voltage between the gate electrode and the emitter electrode when the control member 34 is an IGBT, or even the voltage between the gate electrode and the drain electrode when the control member 34 is a MOSFET.

By way of a variant, the measured voltage is the voltage between the collector electrode and the emitter electrode when the control member 34 is an IGBT, or even the voltage between the source electrode and the drain electrode when the control member 34 is a MOSFET.

The measuring means 40 then include an element 100 for sampling said voltage.

In addition, the measuring means 40 comprise the member 54 for filtering the electrical variable measured. In the example of the embodiment shown in FIG. 6, the filtering member 54 is a first order filter that makes it possible to obtain an average value of the voltage sampled by the sampling unit 100.

The inhibiting means 42 are adapted for inhibiting the control member 34 when the measured electrical variable satisfies a predetermined criterion. The predetermined criterion is, for example, the exceeding of the second threshold, and the second threshold has a predetermined value such that the control member 34 is inhibited by the inhibiting means 42 after the actuator 20 has triggered the opening of the movable contacts 16 in the event of detection of a differential fault.

The inhibiting means 42 include, for example, the hysteresis comparator 56 connected to the output of the measuring means 40, in order to compare the measured parameter deriving from the measuring means 40 with the second threshold.

The anode of thyristor 44 is connected to the electromagnetic coil 30. The gate terminal of the thyristor 44 is connected to the detecting and driving means 36, the inhibiting means 42, as well as to the sampling element 100. The cathode of the thyristor 44 is connected to the capacitor 62 of the filtering member.

Figure 6:
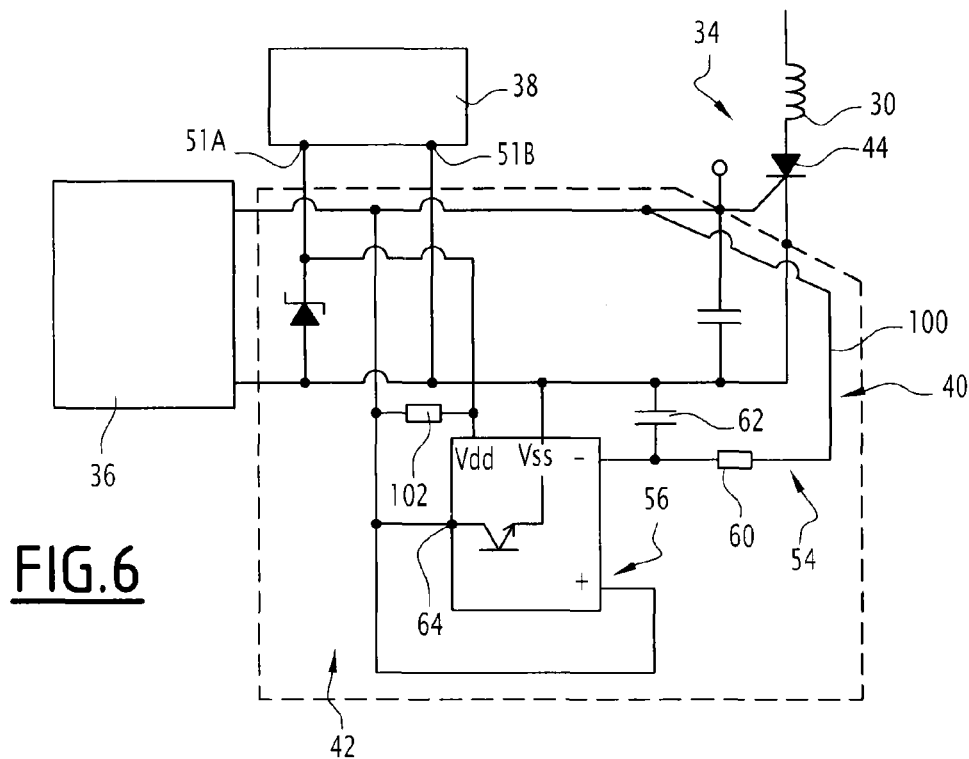
FIG. 6 is a view similar to that in FIG. 2 according to a second embodiment of the invention, the differential protection device comprising a thyristor for controlling the actuator, the means for driving the control thyristor, the means for measuring the voltage between the gate and the cathode of the thyristor and the means for inhibiting the control thyristor when said voltage satisfies a predetermined criterion.

In the example of the embodiment shown in FIG. 6, the sampling element 100 is in the form of an electric wire connected between the gate terminal of the thyristor 44 and the second resistor 60 of the filtering member.

In the example of the embodiment shown in FIG. 6, the filtering member 54 includes the second resistor 60 and the capacitor 62. Capacitor 62 is connected between the cathode of the thyristor 44 and the inverting input of the hysteresis comparator 56, and the second resistor 60 is connected between the gate of the thyristor 44 and the inverting input of the hysteresis comparator 56.

The hysteresis comparator 56 includes the inverting input, connected to the output of the filtering member 54, the non-inverting input, and the output terminal 64, for example with open collector. In other words, the inhibiting means 12 comprise an open collector transistor, connected between the gate terminal of the thyristor 44 and the cathode of the thyristor 44, the open collector transistor being turned on so as to inhibit the control member 34.

The hysteresis comparator 56 also includes the first and the second power supply terminals Vdd, Vss, connected to the power supply circuit 38.

The hysteresis comparator 56 includes a seventh resistor 102 connected between the output terminal 64 and the power supply terminal Vdd.

The second threshold of predetermined value is the voltage present at the non-inverting input of the hysteresis comparator 56, in order to be compared with the voltage which is a function of the average value of the voltage emanating from the sampling element 100 and is present at the inverting input of the hysteresis comparator 56, said average value being derived from the filtering member 54. In the example of the embodiment shown in FIG. 6, the second threshold is biased by the power supply voltage of the comparator 56 received from the terminal Vdd, the non-inverting input being connected directly to the output terminal 64, which is itself connected to the power supply terminal Vdd via the seventh resistor 102.

In the example of the embodiment described, the output terminal 64 of the comparator is connected directly to the control member 34, for example directly to the gate terminal of the thyristor 44.

Figure 7:
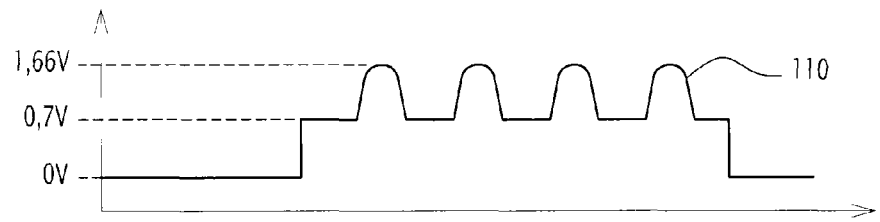
FIG. 7 is a curve of said voltage between the gate and cathode of the thyristor shown in FIG. 6.
Figure 8:
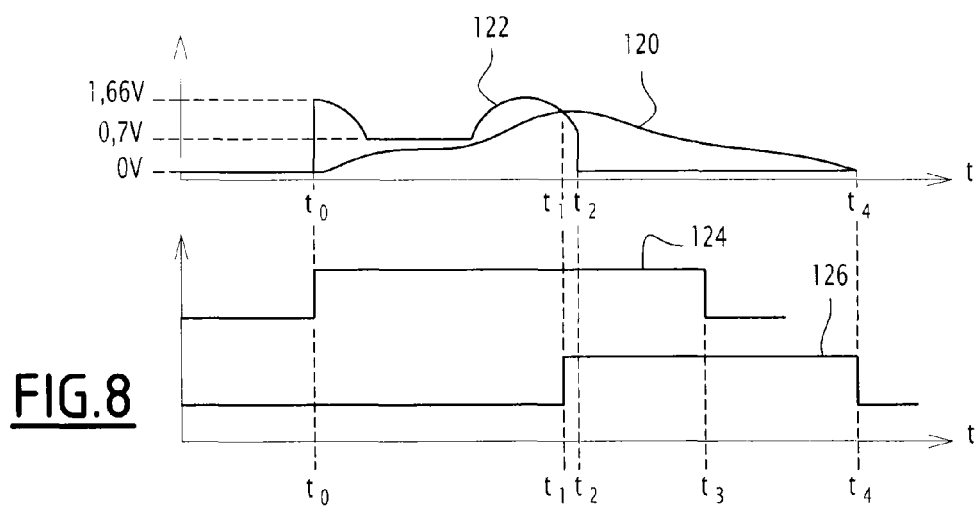
FIG. 8 is a set of theoretical curves representing the respective voltages in two input terminals and an output terminal of said inhibiting means shown in FIG. 6, as well as the output voltage of the driving means shown in FIG. 6.
Figure 9:
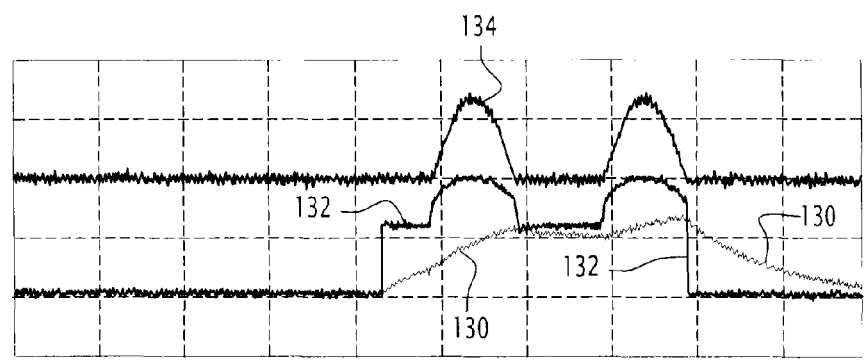
FIG. 9 is a set of measured curves representing, on the one hand, the electric current flowing in the coil of the actuator shown in FIG. 1, and on the other hand, the respective voltages at the two input terminals of the inhibiting means shown in FIG. 6.

The operation of the differential protection device 22 according to this second embodiment shall now be explained with the aid of FIGS. 7 to 9.

The differential protection device 22 according to this second embodiment uses the fact that the junction between the gate terminal and the cathode of the thyristor corresponds to a diode.

When the thyristor is controlled by application of a control current to its gate terminal, the voltage between the gate terminal and the cathode is then an image of the current flowing in the electromagnetic coil 30 with a offset of about 0.7 V corresponding to the diode voltage, and the voltage between the gate terminal and the cathode corresponding to the theoretical curve 110 visible in FIG. 7.

The filtering member 54 is, in the example of the embodiment described, a first order filter, and serves as an average of the voltage of the gate terminal. The voltage at the inverting input of the comparator 56, represented by the theoretical curve 120 in FIG. 8, is thus an average value of the voltage of the gate terminal, the value of which increases gradually until it exceeds the diode voltage of the order of 0.7 V, to be comprised between said diode voltage and the peak value of the gate terminal voltage, of the order of 1.6 V.

The gate terminal voltage also serves as reference for the second threshold. The voltage at the non-inverting input of the comparator 56, represented by the theoretical curve 122 in FIG. 8, then corresponds to the gate voltage, also visible in FIG. 7.

In FIG. 8, the theoretical curve 124 represents the state of the output of the detecting and driving means 36 which may be adapted for taking two values among a low state and a high state, the high state corresponding to the command from the control member 34 upon the detection of a differential fault and the low state corresponds to the absence of the command from the control member 34 where no differential fault is detected.

The theoretical curve 126 represents the state of the output of the comparator 56 which may be adapted for taking two values among a low state and a high state, the high state corresponding to the eventuality of an open collector output transistor of the comparator being in the conducting ('on') mode, and the output terminal 64 is then at 0 V, and the low state of the curve 126 corresponds to the eventuality of an open collector output transistor of the comparator being in the non-conducting ('off') mode, and the output terminal 64 is then in high impedance state. In other words, the high state of the curve 126 corresponds to the inhibition of the control member 34, and in particular of the thyristor 44, whatever be the control signal provided to the control member 34 by the detection and driving means 36. The low state of the curve 126 corresponds to the absence of inhibition of the control member 34, the control member 34 then being driven by the detecting and driving means 36.

In the absence of a differential fault current, prior to a time instant $t_0$ in the FIG. 8, the control member 34, in particular the thyristor 44, is not commanded (curve 124 in the low state), and the control voltage of the thyristor 44, that is the gate terminal voltage, is null. The voltage present at the inverting input of the hysteresis comparator 56 is then null, and is thus not higher than the voltage present at the non-inverting input of the comparator 56, the non-inverting input being biased at the gate terminal voltage which is then null. The output terminal 64 of the hysteresis comparator 56 is thus in a state of high impedance, and the control member 34 is then not inhibited (curve 126 in the low state).

In the presence of a differential fault current and when the electric disconnecting apparatus 10 is connected in reverse, that is to say, with the electrical source connected upstream of the measuring toroid 18 and the movable contacts 16, the detection and driving means 36 drive the control member 34, in particular the thyristor 44, by means of a current command, and the gate terminal voltage of the thyristor 44 varies between about 0.7 V. and 1.66 V. The averaged voltage emanating from the filtering member 54 (curve 120) gradually increases until it exceeds the gate terminal voltage (curve 122) at a time instant $t_1$ in FIG. 8. At this time instant $t_1$, the surpassing of the second threshold is detected by the comparator 56. The output terminal 64 of the hysteresis comparator 56 then goes into a low impedance state, which thereby inhibits the control member 34, in particular the thyristor 44 (curve 126 in the high state). The thyristor 44 then turns off at the instant of the zero crossing of the current, at a time instant $t_2$ in FIG. 8.

It should be noted that at this time instant $t_2$ the gate terminal voltage (curve 122) is null, even though the output of the detecting and driving means 36 is still a command from the control member 34 (curve 124 in the high state). In other words, the control member 34 is then inhibited by the inhibiting means even though the control member 34 continues to receive a command signal from the detecting and driving means 36.

The filtering member 54 moreover is also dimensioned in a manner such that the output of the comparator 56 remains in low impedance state, that is, in state of inhibition of the control member 34, for a sufficiently long period in order for the output of the detecting and driving means 36 to return to the low state, at a time instant $t_3$ in FIG. 8, before the averaged voltage emanating from the filtering member 54 is cancelled out and the output terminal 64 of the hysteresis comparator 56 returns to a state of high impedance, at a time instant $t_4$ in FIG. 8, with the control member 34 then no longer being inhibited (curve 126 in the low state).

In FIG. 9, the curves 130 to 134 illustrate the results of tests carried out, the curve 130 representing the voltage on the inverting input of the comparator 56, or even the control voltage applied to the gate terminal of the thyristor 44, the gate terminal voltage serving as a reference for the second threshold. The curve 132 represents the voltage on the non inverting input of the comparator 56, that is to say the average of the voltage of the gate terminal derived from the filtering member 54, and the curve 134 represents the current flowing in the electromagnetic coil 30. It is then observed that the current in the electromagnetic coil 30 is cancelled out, by inhibition of the control member 34 with the use of the inhibiting means 42, when the voltage on the inverting input of the comparator 56 is higher than the voltage on the non inverting input of the comparator 56.

The differential protection device 22 according to this second embodiment thus also makes it possible to limit the heating of the electromagnetic coil 30, and thereby to avoid the destruction of the actuator 20 upon the occurrence of an electrical fault, in particular when the electric disconnecting apparatus 10 is connected in reverse.

Moreover the differential protection device 22 is also inexpensive, since it does not require the addition of an auxiliary power switch connected directly between the electrical conductors 12. In this second embodiment, the differential protection device 22 also does not include any auxiliary power switch arranged directly between the electrical conductors 12.

FIG. 10 illustrates a third embodiment of the invention, for which the elements that are identical to those in the first or the second embodiment, as previously described above, are identified by identical reference numerals and shall not be described again.

According to this third embodiment, the electric disconnecting apparatus 10 comprises two electrical conductors 12, that is the phase conductor and the neutral conductor, one single fixed contact 14 and one single movable contact 16, the neutral conductor is not adapted to be switched by the disconnecting apparatus 10 according to this third embodiment. In other words, the disconnecting apparatus 10 according to this third embodiment corresponds to a single phase apparatus without switching of the neutral.

The electrical variable measured by the measuring means 40 is the current that is adapted for flowing through the control member 34, such as previously described above for the first embodiment, or indeed the voltage of the control member 34, such as previously described for the second embodiment.

The operation of this third embodiment is identical to that previously described above for the first embodiment when the measured variable is the current that is adapted for flowing through the control member 34, or indeed identical to that previously described above for the second embodiment when the measured variable is the voltage of the control member 34.

The advantages of this third embodiment are identical to those previously described above for the first and second embodiments.

FIG. 11 illustrates a fourth embodiment of the invention, for which the elements that are identical to those in the first or the second embodiment, as previously described above, are identified by identical reference numerals and shall not be described again.

According to this fourth embodiment, the electric disconnecting apparatus 10 comprises three electrical conductors 12, that is, three phase conductors, three fixed contacts 14 and three movable contacts 16. In other words, the disconnecting apparatus 10 according to this fourth embodiment is a three pole apparatus with or without switching of the neutral.

According to this fourth embodiment, the control member 34 is a static switch and is controllable between a conducting state and a non-conducting state. The control member 34 includes, for example, a transistor 144, such as a bipolar transistor, or even a bipolar transistor with insulated gate, also called IGBT (acronym for Insulated Gate Bipolar Transistor). By way of a variant, the control member 34 includes a thyristor.

According to this fourth embodiment, the rectifier 46 is connected directly to the electrical conductors 12, with the actuator 20 then being disposed between the rectifier 46 and the detection means 36. In the case of a three phase or four pole disconnecting apparatus, the act of connecting the coil 30 of the actuator 20 between the rectifier 46 and the detection means 36, that is to say, downstream from the rectifier 46, makes it possible to avoid disruption of the control of the actuator 20 in the event of the loss of a phase.

The operation of this fourth embodiment is identical to that previously described above for the first embodiment when the measured variable is the current that is adapted for flowing through the control member 34, or indeed identical to that previously described above for the second embodiment when the measured variable is the voltage of the control member 34, with the convention according to which the gate terminal of the thyristor 44 corresponds to the gate electrode of the IGBT 144, the anode and the cathode of the thyristor 44 respectively corresponding to the collector electrode and the emitter electrode of the IGBT 144.

The advantages of this fourth embodiment are identical to those previously described above for the first and second embodiments.

FIG. 12 illustrates a fifth embodiment of the invention, for which the elements that are identical to those in the first or the second embodiment, as previously described above, are identified by identical reference numerals and shall not be described again.

According to this fifth embodiment, the electric disconnecting apparatus 10 comprises four electrical conductors 12, that is, three phase conductors, and one neutral conductor, four fixed contacts 14 and four movable contacts 16. In other words, the disconnecting apparatus 10 according to this fifth embodiment is a four pole apparatus with switching of the neutral.

According to this fifth embodiment, the control member 34 is a static switch and is controllable between a conducting state and a non-conducting state. The control member 34 includes, for example, a transistor 144, such as a bipolar transistor, or even a bipolar transistor with insulated gate, also called IGBT (acronym for Insulated Gate Bipolar Transistor). By way of a variant, the control member 34 includes a thyristor.

According to this fifth embodiment, and in a manner similar to the fourth embodiment, the rectifier 46 is connected directly to the electrical conductors 12, with the actuator 20 then being disposed between the rectifier 46 and the detection means 36, that is to say, downstream from the rectifier 46.

The differential protection device 22 also includes an auxiliary switch 150 connected between the power supply circuit 38 and the inhibiting means 42, the auxiliary switch 150 being controlled by the actuator 20. More precisely, the auxiliary switch 150 is connected between, on the one hand, a terminal common to the resistor 48 and the capacitor 50 of the power supply circuit 38 and on the other hand, the filter 54. In this case, the actuation of the auxiliary switch 150 is reversed relative to the actuation of the movable contacts 16 by using a switch 150 that is normally open, or indeed the actuation of the auxiliary switch 150 is not reversed relative to the actuation of the movable contacts 16 by using a switch 150 that is normally closed and the inputs of the comparator 56 are then permuted.

The operation of this fifth embodiment is furthermore identical to that previously described above for the first embodiment when the measured variable is the current that is adapted for flowing through the control member 34, or indeed identical to that previously described above for the second embodiment when the measured variable is the voltage of the control member 34, with the convention according to which the gate terminal of the thyristor 44 corresponds to the gate electrode of the IGBT 144, the anode and the cathode of the thyristor 44 respectively corresponding to the collector electrode and the emitter electrode of the IGBT 144.

The advantages of this fifth embodiment are identical to those previously described above for the first and second embodiments.

The auxiliary switch 150 forms a digital (on/off) input to the inhibiting means 42, and in addition provides the ability to avoid an unwanted stray command from the electromagnetic coil 30 of the actuator when the circuit breaker has been activated as a result of the detection of a differential fault, and thus provides greater protection for the magnetic coil 30. In other words, the auxiliary switch 150 makes it possible to confirm the opening of the movable contact or contacts 16 of the circuit breaker.

In addition or by way of a variant, not shown, the differential protection device 22 includes an auxiliary switch connected between the power supply circuit 38 and the detecting and driving means 36, said auxiliary switch being controlled by the actuator 20. According to this variant, the auxiliary switch moreover also makes it possible, when it is in a non-conducting state, to switch off the power supply of the detecting and driving means 36, which causes the control member 34 to be shut off and thus provides greater protection for the magnetic coil 30. In other words, this auxiliary switch also makes it possible to confirm the opening of the movable contact or contacts 16 of the circuit breaker after activating as a result of the detection of a differential fault by preventing an unwanted stray command from the electromagnetic coil 30.

The auxiliary switch or switches 150 according to this fifth embodiment may be distinguished from an auxiliary power supply switch which would be connected directly between the electrical conductors 12, since they are not connected directly between the electrical conductors 12, and are provided for interrupting the passage of a low power current, such as a current lower than 10 mA, and not the passage of a high power current, namely the current flowing through the electrical conductors 12, such as a current greater than 500 mA. The differential protection device 22 is thus also inexpensive according to this fifth embodiment, since it does not require the addition of an auxiliary power switch connected directly between the electrical conductors 12.

It is thus understood that the differential protection device 22 according to the invention makes it possible to prevent the destruction of the actuator 20 upon the occurrence of an electrical fault when the electric disconnecting apparatus 10 is connected in reverse.

The invention claimed is:

1. A differential protection device for an electric disconnecting apparatus, the disconnecting apparatus comprising at least one fixed contact for being connected to a corresponding electrical conductor, at least one movable contact, each movable contact being movable between a closed position, wherein the movable contact is electrically connected to the corresponding fixed contact, and an open position, wherein the movable contact is electrically isolated from the corresponding fixed contact, and an actuator for activating the opening of the movable contacts when a differential fault is detected, the differential protection device comprising:
a controller for controlling the actuator coupled to a toroid surrounding the corresponding electrical conductor, the controller including at least two electrodes,
wherein the differential protection device further comprises:
measuring circuitry for measuring an electrical variable associated with the controller, said electrical variable being a voltage or a current between two electrodes among said at least two electrodes of the controller, and
inhibiting circuitry for inhibiting the controller when the measured electrical variable satisfies a predetermined criterion.

2. The device according to claim 1, wherein the measured electrical variable is a current adapted for flowing through the controller.

3. A device according to claim 1, wherein the controller includes two conducting electrodes and one control electrode, and the measured electrical variable is a voltage of the controller, measured between two electrodes among the electrodes of the controller.

4. A device according claim 1, wherein the controller is a static switch.

5. A device according to claim 4, wherein the static switch is an element selected from the group consisting of: an insulated gate field effect transistor, a bipolar transistor, an insulated gate bipolar transistor and a thyristor.

6. A device according to claim 3, wherein the controller is a thyristor, and the measuring circuitry is adapted for measuring a current according to a voltage between a gate and a cathode of the thyristor.

7. A device according to claim 3, wherein the controller is a transistor and the measuring circuitry is adapted for measuring a current via the voltage between the control electrode and the drain electrode or the emitter electrode of said transistor.

8. A device according to claim 7, wherein the transistor is an element selected from the group consisting of: an insulated gate field effect transistor, a bipolar transistor and an insulated gate bipolar transistor.

9. A device according to claim 1, wherein the device comprises detecting and driving circuitry for detecting a differential fault and for driving the controller, the detecting and driving circuitry being adapted for being connected to the toroid and for providing a control signal to the controller when a differential fault is detected, and the inhibiting circuitry is adapted, when the measured electrical variable satisfies the predetermined criterion, for inhibiting the controller.

10. A device according to claim 9, wherein the inhibiting circuitry comprises a switch connected in series between the detecting and driving circuitry and a control electrode of the controller, the switch being open in order to inhibit the controller.

11. A device according to claim 9, wherein the inhibiting circuitry comprises a switch connected between a control electrode and a conduction electrode of the controller, the switch being closed in order to inhibit the controller.

12. A device according to claim 9, wherein the inhibiting circuitry comprises an open collector transistor, connected between a control electrode and a conduction electrode of the controller, the open collector transistor being turned on in order to inhibit the controller.

13. A device according to claim 1, wherein the predetermined criterion is the exceeding of a threshold, and the threshold has a predetermined value such that the controller is inhibited by the inhibiting circuitry after the actuator has activated the opening of the movable contacts in case of detection of a differential fault.

14. A device according to claim 1, wherein the measuring circuitry comprises a filter member for filtering the electrical variable, the filter member preferably comprising a resistor and a capacitor.

15. A device according to claim 1, wherein the inhibiting circuitry comprises a hysteresis comparator connected to the output of the measuring circuitry.

16. An electric disconnecting apparatus comprising:
at least two electrical conductors,
at least one fixed contact connected a corresponding electrical conductor,
at least one movable contact, each movable contact being movable between a closed position and an open position, the movable contact being electrically connected to the corresponding fixed contact in the closed position and electrically isolated from the corresponding fixed contact in the open position,
a toroid for measuring the differential current, the toroid surrounding the electrical conductors,
an actuator for activating the opening of the movable contact or contacts when a differential fault is detected via the toroid, and
a differential protection device connected to the toroid and to the actuator,
wherein said differential protection device is in accordance with claim 1.

17. An apparatus according to claim 16, wherein the actuator includes an electromagnetic coil, one end of the electromagnetic coil being connected to the controller.

18. A differential protection device for an electric disconnecting apparatus, the disconnecting apparatus comprising at least one fixed contact for being connected to a corresponding electrical conductor, at least one movable contact, each movable contact being movable between a closed position, wherein the movable contact is electrically connected to the corresponding fixed contact, and an open position, wherein the movable contact is electrically isolated from the corresponding fixed contact, and an actuator for activating the opening of the movable contacts when a differential fault is detected,
the differential protection device comprising:
a thyristor for controlling the actuator coupled to a toroid surrounding the corresponding electrical conductor, the thyristor including two conducting electrodes and one control electrode,
wherein the differential protection device further comprises:
measuring circuitry for measuring (i) a voltage of the thyristor measured between two electrodes among the electrodes of the thyristor or measuring (ii) a current according to a voltage between a gate and a cathode of the thyristor, and
inhibiting circuitry for inhibiting the thyristor when the measured voltage or current satisfies a predetermined criterion.

19. A differential protection device for an electric disconnecting apparatus, the disconnecting apparatus comprising at least one fixed contact for being connected to a corresponding electrical conductor, at least one movable contact, each movable contact being movable between a closed position, wherein the movable contact is electrically connected to the corresponding fixed contact, and an open position, wherein the movable contact is electrically isolated from the corresponding fixed contact, and an actuator for activating the opening of the movable contacts when a differential fault is detected,
the differential protection device comprising:
a transistor for controlling the actuator coupled to a toroid surrounding the corresponding electrical conductor, the transistor including two conducting electrodes and one control electrode,
wherein the differential protection device further comprises:
measuring circuitry for measuring (i) a voltage of the transistor measured between the control electrode and one of the two conducting electrodes of the transistor or measuring (ii) a current according to a voltage between the control electrode and one of the two conducting electrodes of the transistor, and inhibiting circuitry for inhibiting the transistor when the measured voltage or current satisfies a predetermined criterion.

* * * * *